F. A. MORLEY.
Liquid-Meters.

No. 153,222. Patented July 21, 1874.

Witnesses.
Saml. H. Cook
Wm. Pettit

Inventor.
F. A. Morley

UNITED STATES PATENT OFFICE.

FRANKLIN A. MORLEY, OF CHICAGO, ILLINOIS.

IMPROVEMENT IN LIQUID-METERS.

Specification forming part of Letters Patent No. 153,222, dated July 21, 1874; application filed June 11, 1874.

*To all whom it may concern:*

Be it known that I, FRANKLIN A. MORLEY, of Chicago, in the county of Cook and State of Illinois, have invented certain Improvements in Water or Liquid-Meters, of which the following is a specification:

This invention relates to that class of meters known as reaction or current meters, in which the measuring and registering devices are actuated by a current or flow of water through the meter, acting upon a spiral screw or some one of the various modifications of the water-wheel to give motion to the registering devices corresponding with the flow of water.

The main objection to this class of meters has been, that under a small flow of water the current would not be sufficiently active to move the wheel and registering devices, and consequently no account would be made of water passing through the meter under such conditions, thus causing inaccuracy and unreliability of action.

The object of this invention is to obviate this objection and to so construct a current-meter that no water can pass through it, however slow the flow may be, without being measured and registered with the same accuracy and certainty as with a full flow of water through the meter; and the invention consists in combining with a current-wheel a compensating chamber and piston, in such manner that when the flow of water is rapid the meter acts simply as a current-meter, but when the flow of water is considerably reduced the piston comes into action automatically and gives the current-wheel an active flow of water intermittently, while the meter is delivering a slow continuous flow, thus insuring action of the current-wheel under all conditions with uniformity, as hereinafter more fully explained.

Figure 1:
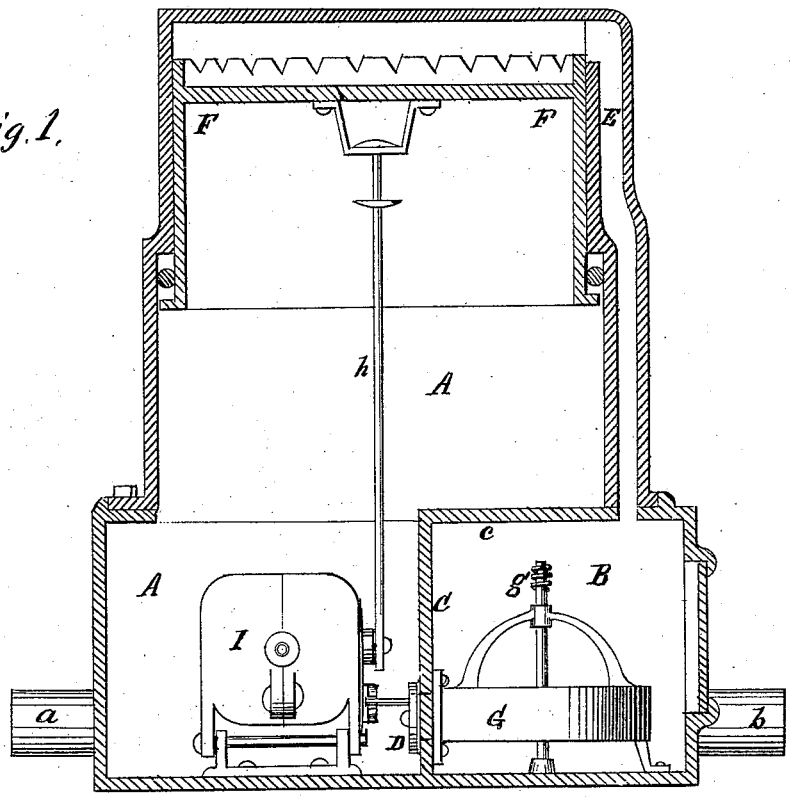
Figure 2:
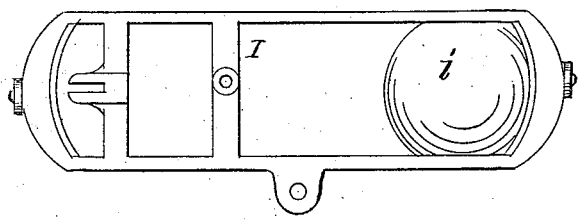
Figure 3:
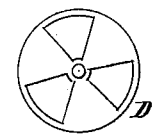

Figure 1 is a vertical section. Figs. 2 and 3 are detail views.

Similar letters of reference indicate like parts in the several figures.

The body of the meter is divided into two compartments, A B, by the wall C c. The compartment A has an inlet-pipe, a, and the compartment B has an outlet or discharge pipe, b. The said compartments also connect with each other by a port that is controlled by a valve, D, and by a pipe, E. The compartment or chamber A contains the regulating-piston F and devices for operating the valve D, and the other compartment, B, contains the current-wheel G and suitable registering-gearing, that is operated by the worm g, but not shown. The upper portion of compartment A is made cylindrical in form, and a piston, F, works vertically therein. A rod, h, connects the piston F with a tilting cage, I, that contains a rolling weight, i, as shown by side view, Fig. 2, for operating the valve D.

The action of the meter is as follows: As water is taken from the outlet-pipe b, a slight differential pressure is caused between the chambers A and B, the water-pressure being greatest in chamber A, and this causes the piston to be raised, the water above it flowing down the pipe E to the outlet-pipe b. When the piston has reached its full height the cage I is tilted by its rolling weight and the valve D is thrown open. If the demand made by the pipe b is considerable, the piston F remains elevated and holds the valve D constantly open, so that a continuous flow of water is given to the current-wheel G; but should the demand for water made by pipe b be small, then, after the piston F has opened the valve D, the said piston descends by its weight, forcing an active flow of water through the open valve into the current-wheel, a portion of this water passing up the passage E to the upper or rear side of the piston; and when the piston reaches the lower end of its stroke and closes the valve D, the wheel G becomes inactive for a time, while the pipe b draws its supply of water from above the piston by the pipe E, this water above the piston having been measured during the last down-stroke of the piston. And when the piston has again reached its up point of stroke the same operation of opening the valve D and throwing an active flow through the wheel by the weight of the piston is repeated as before, thus the current-wheel alone taking all of the work when the flow is active, and the piston coming into action only for slow work, by which a great degree of durability in wear is secured, with a positive measurement. The valve D is a circular plate, pivoted at its center to the wall C, and has several openings, as shown in face view, Fig. 3, that engage with similar openings in the wall C when the valve is open. A slide-valve moving vertically on the wall C can be used. A clapper-valve attached to the wall C by a hinge-joint has been found to work well, but requires more room than the sliding valves above mentioned. This construction of current-meter has been tried and found to work well, measuring and recording the slowest possible flow of water with the same accuracy and facility as when working with a full flow. A flexible diaphragm can be used in place of the piston F, by loading the diaphragm so that its weight will cause a current to flow through the open valve D to the rear side of the diaphragm by the pipe E, when the demand on the meter is not an active one, as before described. I, however, consider the piston as preferable.

What I claim, and desire to secure by Letters Patent, is—

In a current or reaction meter, the combination of the piston F with the current-wheel G, the said devices being separated by a partition, C, that is provided with a valve, D, and suitable valve-operating devices, substantially as shown and described, and the whole constructed so that the action of the wheel G is intermittent for a slow, constant delivery from the meter, but continuous when the delivery is rapid, for the purpose herein set forth.

F. A. MORLEY.

Witnesses:
  SAML. H. COOK,
  WM. PETTIT.